P. Estes.
Steam-Engine.
4279
REISSUED FEB 28 1871
Fig. 1
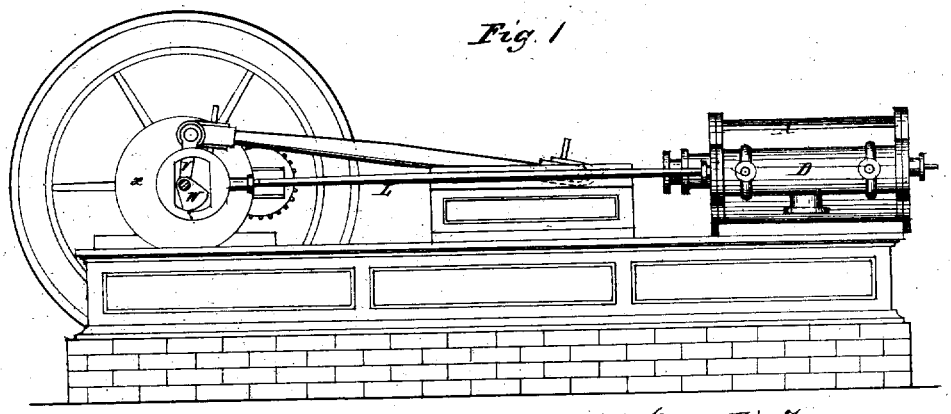
Fig 6. Fig 7.
Fig 2
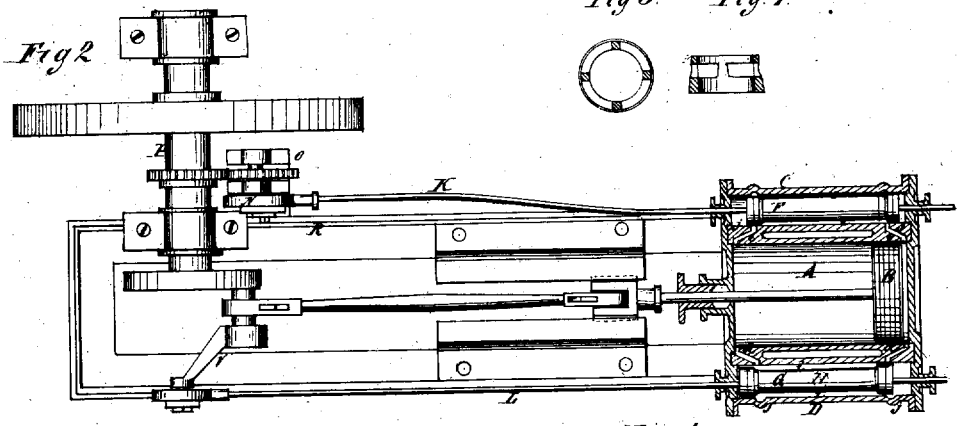
Fig. 3.
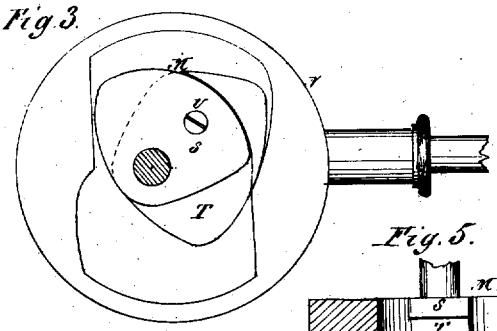
Fig. 4
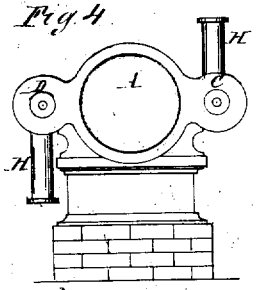
Fig. 5.
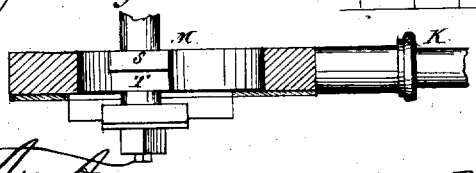
Witnesses:
H. J. Arretz
A. M. Tanner
Inventor:
P. Estes.
PER Munn & Co
Attorneys.

UNITED STATES PATENT OFFICE.

PHILIP ESTES, OF LEAVENWORTH, KANSAS.

IMPROVEMENT IN STEAM ENGINES.

Specification forming part of Letters Patent No. 108,576, dated October 25, 1870; Reissue No. 4,279, dated February 28, 1871.

*To all whom it may concern:*

Be it known that I, PHILIP ESTES, of Leavenworth, in the county of Leavenworth and State of Kansas, have invented a new and useful Improvement in Steam-Engines; and I do hereby declare that the following is a full, clear, and exact description thereof, which will enable others skilled in the art to make and use the same, reference being had to the accompanying drawings, forming a part of this specification.

My invention relates to steam-engines; and my object is to introduce certain improvements thereon, which will first be described in connection with all that is necessary to a full understanding thereof, and then be clearly pointed out in the claims.

In the accompanying drawings, Figure 1 represents a side view of the engine, showing the exhaust-valve chamber and the cam by which the exhaust-valve is operated. Fig. 2 is a top or plan view of the engine, but showing the cylinder and the receiving and exhaust chambers in section, and giving a view of the ports to and from the cylinder for receiving and exhausting the steam. Fig. 3 is a detail of the cam for working the steam or receiving valve, showing the mode of adjusting it for forming a variable cut-off. Fig. 4 is an end view of the cylinder and valve-chambers. Fig. 5 is a section of Fig. 3. Fig. 6 is a cross-section, and Fig. 7 is a longitudinal section, of the cylindrical seats in which the valves work.

Similar letters of reference indicate corresponding parts.

A is the cylinder. B is the piston. C is the receiving-chamber. D is the exhaust-chamber. These chambers are cylindrical in form and attached to opposite sides of the cylinder A, and correspond in length therewith, as seen in the drawings.

*e* represents the induction and *d* the eduction ports of the cylinder, which, it will be seen, are entirely separate and distinct from each other. The steam is admitted to and exhausted from each end of the cylinder for each stroke of the engine. This arrangement, of course, requires a double valve for each chamber.

F represents the double valve for the induction or receiving chamber, and G the double valve for the eduction or exhaust chamber. Each valve consists of two heads connected by the rods H. The form of the seat in which the valve-heads work is seen in Figs. 6 and 7. *i* is a steam-space around the rods H. *j* are the valve-seats, which are open on their sides, so that the pressure of steam is balanced or equalized upon the valve-heads, thus preventing the friction usually produced by slide-valves. The valves move on a line parallel with the piston of the engine.

K is the stem of the induction-valve. L is the stem of the exhaust-valve. The former is connected with the adjustable cam M, (see Figs. 3 and 4,) which cam revolves in the yoke N, to which the valve-rod K is attached. The cam M is fastened to the end of a small shaft, which is supported by the bracket O. This shaft is revolved from the main shaft P by means of the gear-wheels *g g*. The bracket O is attached to the frame R of the engine.

The cam M is formed in two parts, S and T. By means of the screw U the position of S may be varied on the part T, so as to cut off the steam at any desired point of the stroke.

The exhaust-valve is moved by the crank V on the end of the wrist of the pitman by means of a cam, *w*, working in the yoke X. (See Fig. 1.)

I do not confine myself to the use of cams exclusively for moving either of the valves the proper distance. Eccentrics may be used in this connection, if desired.

By this arrangement and operation of the valves the exhaust-port is kept open during the entire stroke, thus preventing any back-pressure upon the piston. In order to accomplish this important object and to render practicable this peculiar feature of my invention, I operate the exhaust-valve by a cam working in a yoke, which makes one full stroke back and another forward during each revolution of the driving-shaft or axle. Its movement, being short, is quickly made, when it moves loosely in the yoke until the piston has completed its full throw. Thus it makes no difference at what point the steam is cut off at the induction-valve, since in no event is any back action of steam upon the piston possible.

Having thus described my invention, what I claim as new, and desire to secure by Letters Patent, is—

1. A variable cam formed of two parts, S T, arranged and operating to move the cut-off point forward or back, in the manner described.

2. A steam-supply chamber, C, and an exhaust-chamber, D, on opposite sides of a piston-cylinder, A, having inlets *e e*, outlets *d d*, and piston B, all combined, as described, with double-headed valves F G, the one operated differentially and the other always at full stroke, for the purpose specified.

To the above specification of my invention I have signed my hand this 19th day of December, A. D. 1870.

PHILIP ESTES.

Witnesses:
SOLON C. KEMON,
THOS. D. D. OURAND.